July 21, 1970  DE WITT H. DOANE  3,521,548
DAMPER MECHANISM FOR KITCHEN VENTILATING SYSTEMS
Filed Aug. 19, 1968  3 Sheets-Sheet 1

INVENTOR
DEWITT H. DOANE
by: Wolfe, Hubbard, Voit & Osann
ATTYS.

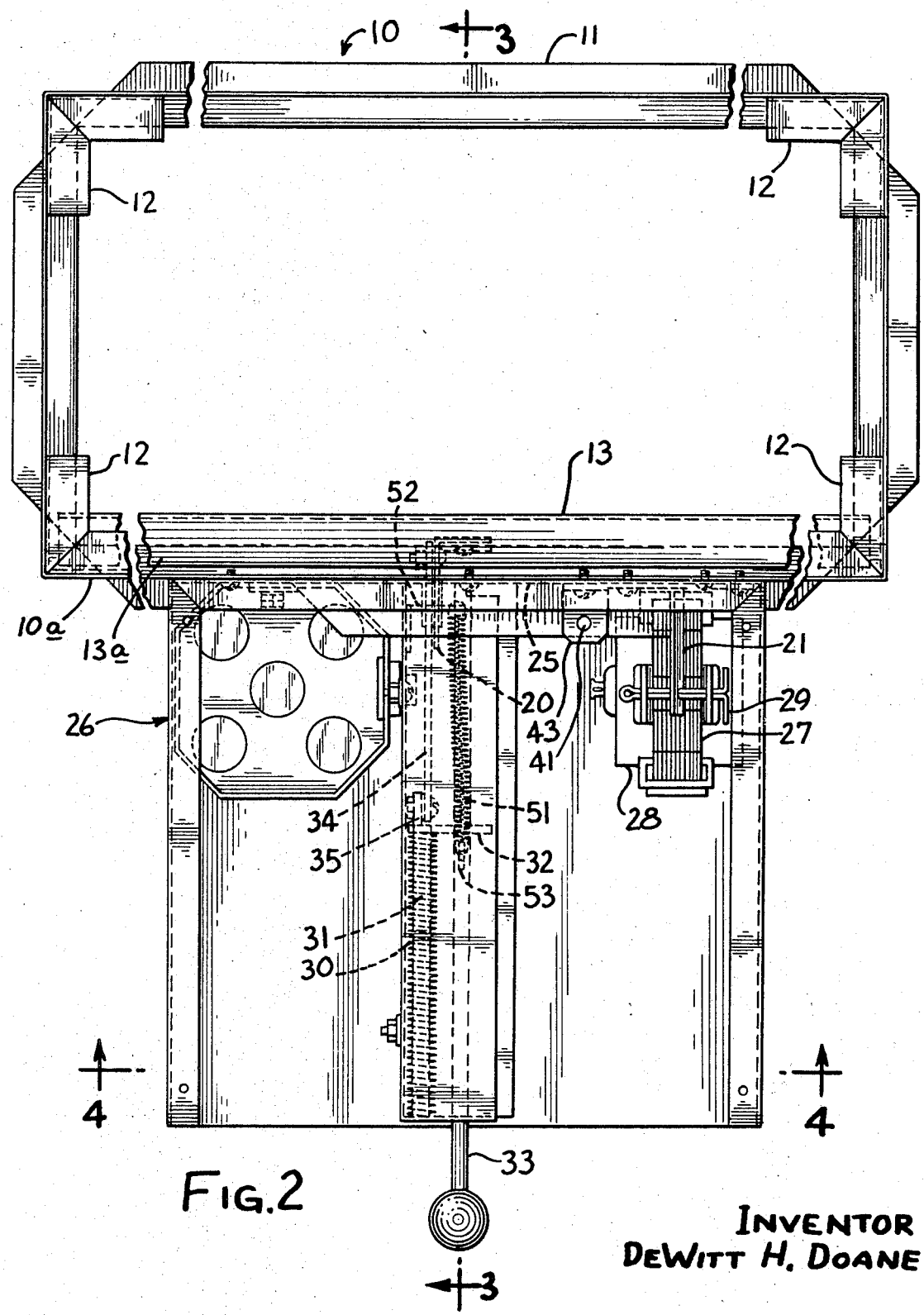

July 21, 1970  DE WITT H. DOANE  3,521,548
DAMPER MECHANISM FOR KITCHEN VENTILATING SYSTEMS
Filed Aug. 19, 1968  3 Sheets-Sheet 3
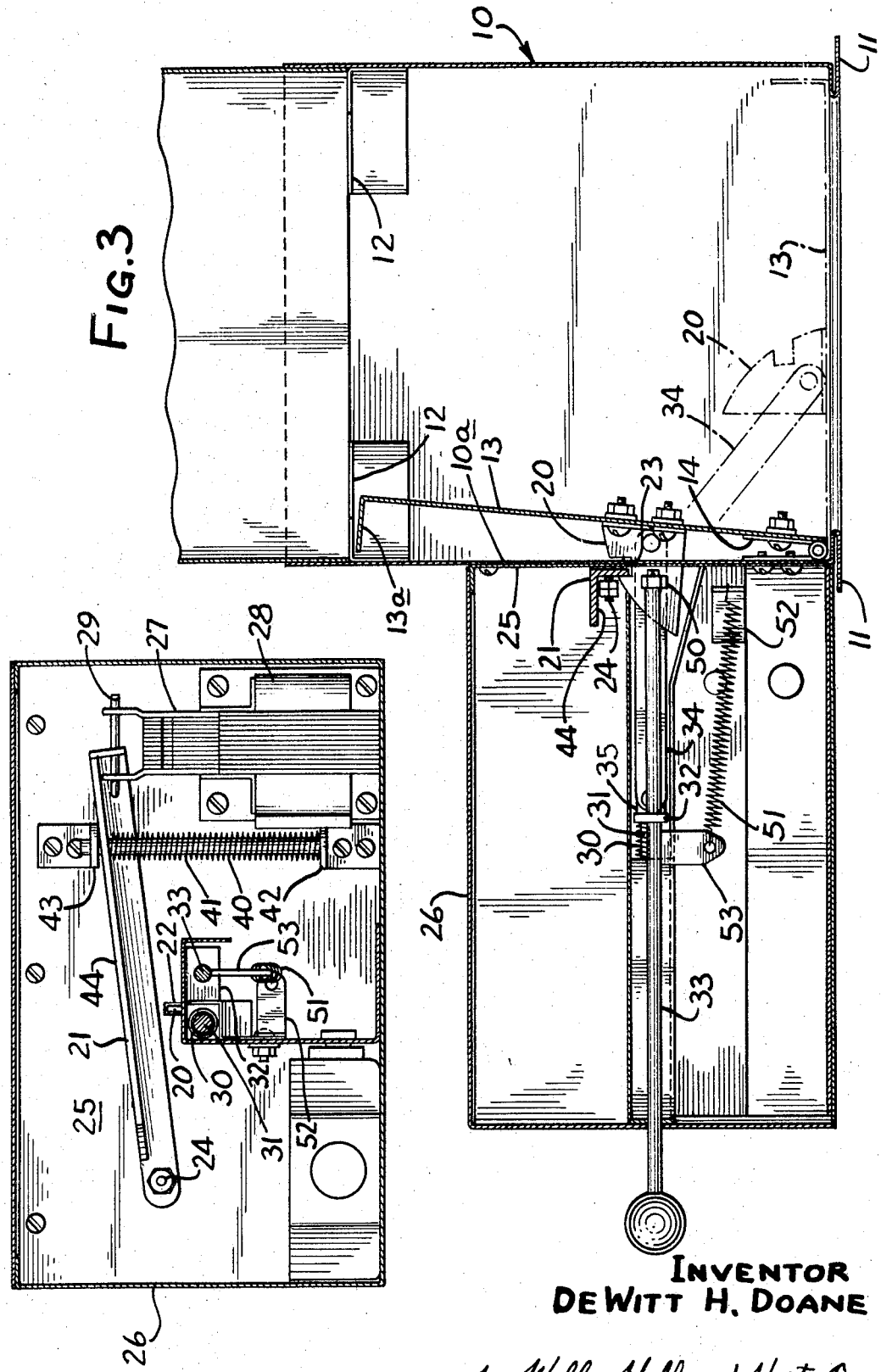
INVENTOR
DE WITT H. DOANE
by: Wolfe, Hubbard, Voit & Osann
ATTYS.

United States Patent Office 3,521,548
Patented July 21, 1970

1

3,521,548
DAMPER MECHANISM FOR KITCHEN VENTILATING SYSTEMS
De Witt H. Doane, Long Grove, Ill., assignor to Cockle Ventilator Company, Inc., a corporation of Illinois
Filed Aug. 19, 1968, Ser. No. 753,607
Int. Cl. F23j 11/00
U.S. Cl. 98—115                                              6 Claims

ABSTRACT OF THE DISCLOSURE

A damper mechanism for kitchen ventilators including a damper door hinged to a sidewall of the ventilator system, and a mechanical latch including a first element mounted on the door and a second element mounted outside the ventilator for latching cooperation with the first element when the door is in its open position. A spring biases the second latching element toward its unlatched position, and a solenoid holds the second element in its latched position where the solenoid is energized. Another spring urges the damper door toward its closed position, so that in the event of a fire, the power shutdown deenergizes the solenoid so that the first spring unlatches the door, and the second spring moves the door to its closed position, thereby providing a fail-safe system. A manual cocking rod is also provided for returning the damper door from its closed position to its open position.

---

The present invention relates generally to kitchen ventilator systems and, more particularly, to an improved damper mechanism for kitchen ventilator systems.

It is the general aim of the present invention to provide an improved kitchen ventilator damper mechanism which closes the ventilator system automatically when a fire occurs in the ventilator system or the building in which it is contained. A more particular object of the invention is to provide such an improved damper mechanism which closes the ventilator system automatically in response to power shutdown during a fire.

It is another object of the present invention to provide an improved damper mechanism of the type described above which is positive-acting and fail-safe.

A further object of this invention is to provide an improved damper mechanism of the foregoing type which can be manufactured effiicently and economically from relatively few low cost parts.

Still another object of the present invention is to provide such an improved damper mechanism in which all the operative parts other than the damper door are located outside the ventilator system so that they are not exposed to the deleterious conditions inside the ventilator system.

It is a still further object of the invention to provide such an improved damper mechanism which has a high degree of reliability combined with a long operating life, even when subjected to repeated opening and closing of the damper door.

Other objects and advantages of the invention will become apparent from the following detailed description and upon reference to the accompanying drawings, in which:

FIG. 2 is an enlarged plan view of the damper mechanism shown in FIG. 1 with the top wall of the housing thereof removed;

FIG. 3 is a section taken along line 3—3 in FIG. 2;

FIG. 4 is a section taken along line 4—4 in FIG. 2; and

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention as defined by the appended claims.

Figure 1:
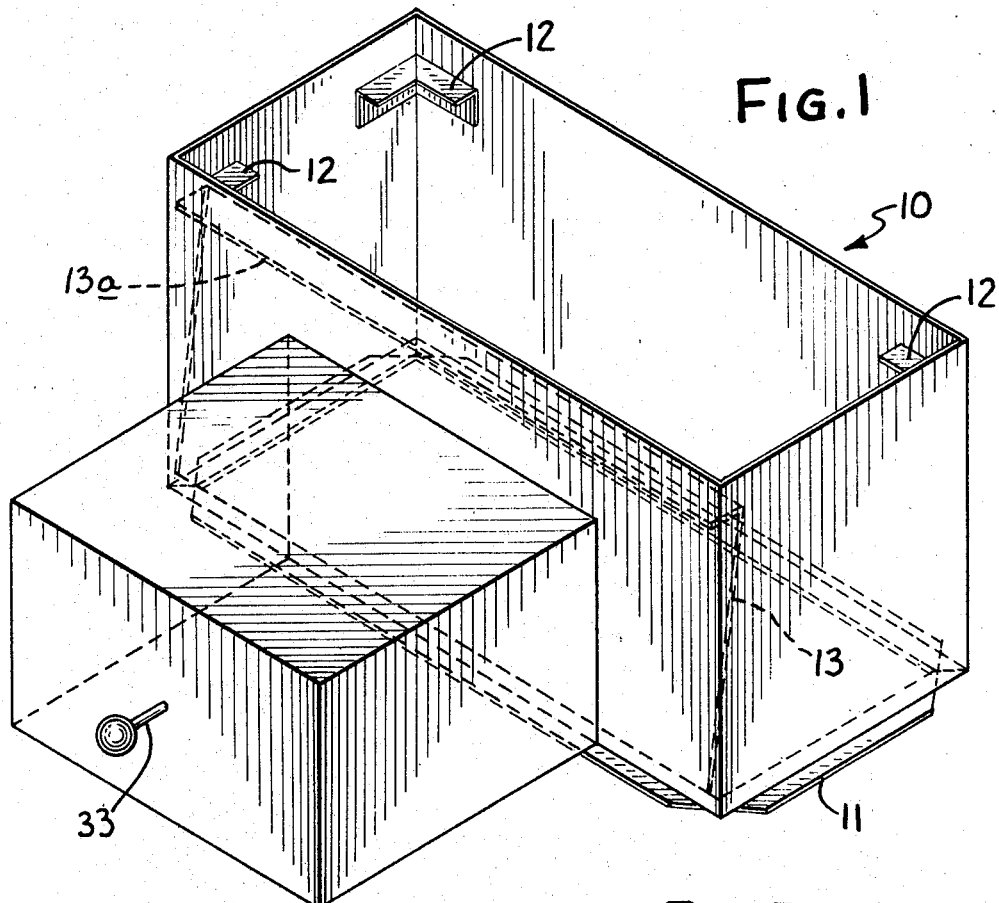
FIG. 1 is a perspective view of a kitchen ventilator damper mechanism embodying the present invention.

Turning now to the drawings, in FIG. 1 there is shown a damper mechanism adapted for use in a kitchen ventilator system, which is conventionally associated with the cooking surface for the purpose of withdrawing grease-laden vapors from the kitchen, the damper being preferably located upstream of the grease extraction system. A fan or blower mounted within the ventilator system draws the vapors into the system, where the condensable vapors are extracted and the resulting exhaust stream conducted to an appropriate outlet for discharge to the atmosphere. The damper mechanism shown in FIG. 1 includes a damper exclosure 10 adapted to form a part of the ventilator system. Thus, the lower end of the enclosure forms an integral flange 11 adapted to be secured to the top of a grease extraction unit, for example, while the top portion of the enclosure 10 includes a plurality of duct stops 12 adapted to engage the end of a duct telescoped into the open upper end of the enclosure 10. With this arrangement, the exhause stream discharged from the top of the grease extraction unit passes through the enclosure 10 and then on through the associated duct for discharge into the atmosphere.

For the purpose of closing the ventilator system, in the event that a fire occurs in the ventilator system, for example, a damper door 13 is pivotally mounted on one sidewall of the enclosure 10 by means of a pair of hinges 14 so that the door can be moved between an open position adjacent the sidewall of the enclosure 10, as illustrated in FIGS. 1 and 3, and closed position where the door rests on the inturned portion of the bottom flange 11. In order to prevent the door 13 from sticking to the sidewall of the enclosure 10, due to the effect of condensed grease for example, the door 13 is spaced away from the sidewall by means of an integral flange 13a formed on the outer end of the door 13.

In accordance with the present invention, an automatic latching control means operatively associated with the damper door has an energized state for latching the damper door in the open position and a deenergized state for unlatching the damper door, and biasing means are provided for urging the damper door toward the closed position to automatically close the door when the automatic latching control means is in the deenergized state. To provide a fail-safe system, the automatic latching control means is connected to the electrical power supply system for the kitchen with which the ventilator system is associated so that shutdown of the electrical supply system in the event of a fire or the like automatically deenergizes the latching control system to unlatch the damper door, whereby the biasing means closes the damper door to prevent the fire from spreading through the ventilator system. Thus, in the illustrative embodiment, a first latching element 20 is secured to the outer surface of the damper door 13, and projects normally therefrom for cooperation with a second latching element 21 outside the ventilator system. More particularly, when the door 13 is in its open position, as illustrated in FIGS. 1 and 3, the latching element 20 extends through a complementally formed aperture 22 in the sidewall 10a to which the door 13 is hinged.

For the purpose of latching the damper door 13 in its open position, the second latching element 21 mounted outside the ventilator system, i.e., outside the enclosure 10, is mounted for pivotal movement between an unlatched position where it is disengaged from the first latching element 20, as shown in FIG. 4, and a latched position where it engages the first latching element 20 by fitting into a notch 23 formed therein, as shown in FIG. 3. In the particular embodiment illustrated, the second latching element 21 is in the form of an L-shaped bar, one end of which is pivoted as at 24 to the forward wall 25 of a housing 26 secured to the sidewall 10a of the enclosure 10 containing the damper door 13. The other end of the L-shaped latching element 21 projects forwardly from the wall 25 for connection to the armature 27 of a solenoid 28 by means of a cotter pin 29. As long as the latching elements 20 and 21 are latched, as shown in FIG. 3, the damper door 13 is positively held in its open position. This is, of course, the normal position of the damper door and the associated latching means during normal operation of the kitchen ventilator system.

In keeping with the present invention, a biasing spring 30 continuously urges the damper door 13 toward its closed position, so that immediately upon release of the latching element 21 from the latching element 20, the damper door 13 is positively advanced to its closed position illustrated in broken lines in FIG. 3. More particularly, the biasing spring 30 is disposed around a supporting rod 31 mounted horizontally within the outer portion of the housing 26. One end of the spring 30 is fixed to the outer end of the rod 31, while the other end is connected to a movable guide member 32 which fits over a resetting or cocking rod 33 for sliding movement thereover. In order to couple the biasing spring 30 to the damper door 13, the guide member 32 is connected to a lever 34 which is pivotally connected at its forward end to the latching element 20 on the door 13, and at its rearward end to a lug 35 integral with the guide number 32. Consequently, when the latching element 21 is pivoted upwardly to its unlatched position so as to disengage it from the latching element 20, the spring 30 immediately drives the guide member 32, the lever 34, and the door 13 forwardly, thereby swinging the door 13 downwardly through the enclosure 10 to its closed position resting against the inturned portion of the bottom flanges 11. As the door moves from its open position to the closed position, the lever 34 tilts downwardly between its pivotal connections to the lug 35 and the guide element 20 so as to maintain a positive connection between the spring 30 and the guide member 32 at one end and the latching element 20 and the door 13 at the other end.

In accordance with one important aspect of the present invention, the solenoid 28 holds the latching element 21 in its latched position, as shown in FIG. 3, as long as the solenoid is energized, and a biasing means is associated with the same latching element 21 for continuously urging the latching element toward its unlatched position, in opposition to the action of the energized solenoid. In FIG. 4, the solenoid 28 is shown in its deenergized state, and a biasing spring 40 holds the latching element 21 in its unlatched position above the other latching element 20. More particularly, the biasing spring 40 is disposed around a supporting rod 41 which is vertically mounted between a pair of fixed lugs 42 and 43 secured to the front wall of the housing 26. The supporting rod 41 passes through a corresponding aperture in a flange 44 formed as an integral part of the latching element 21 so that the latching element 21 is positively guided by the rod 41 during pivotal movement between its latched and unlatched positions.

When the solenoid 28 is energized, the armature 27 thereof is retracted downwardly so as to pull the latching element 21 down into the notch 23 formed by the other latching element 20, thereby positively latching the damper door 13 in its open position as shown in FIG. 3. To provide a fail-safe system, the energizing power for the solenoid 28 is derived from the electrical power supply system for the kitchen with which the ventilator system is associated. As long as this power remains on, the solenoid 28 is continuously energized and, consequently, the latching element 21 is held in its latched position. In the event of a fire, one of the standard safety precautions is to immediately shut down the power in the building, or at least in the kitchen if that is where the fire occurs. Since the solenoid 28 is energized by the standard electrical power supply system for the kitchen, the solenoid 28 will be immediately deenergized in the event of such a power shutdown, thereby releasing the latching element 21 which, in turn, is positively driven to its unlatched position by the action of the biasing spring 40. Upon release of the latching element 21 from the other latching element 20, the biasing spring 30 drives the damper door 13 to its closed position as described previously.

As a further feature of the invention, a resetting means is provided for returning the damper door from its closed position to the open position when the automatic latching control means is restored to its energized state. In the illustrative embodiment, the resetting means is manually operated, and takes the form of a resetting or cocking rod 33 which extends through the outside wall of the housing 26 so that it can be gripped by the resetting operator. To reset the damper mechanism, the operator retracts the rod 33 so that a stop member 50 on the forward end thereof engages the guide number 32 and slides it rearwardly over the rod 33 until it is returned to its original position, illustrated in FIG. 3. As the guide member 32 is retracted, it also retracts the damper door 13 via the interconnecting lever 34 so as to return the door 13 from its closed position to its open position. During this return movement, the arcuate edge of the guide element 20 cams the guide element 21 upwardly away from its latched position until it comes into register with the notch 23, whereupon the guide element 21 drops into the notch 23 to latch the damper door 13 in the open position. When the operator feels the click of the latching element 21 dropping into the notch in the latching element 20, the cocking rod 33 is released, and a biasing spring 51 returns the cocking rod 33 to its advanced position as illustrated in FIG. 3. The spring 51 is fixed at its forward end to a lug 52, while the rearward end of the spring is connected to a lug 53 depending from the cocking rod 33.

Figure 5:
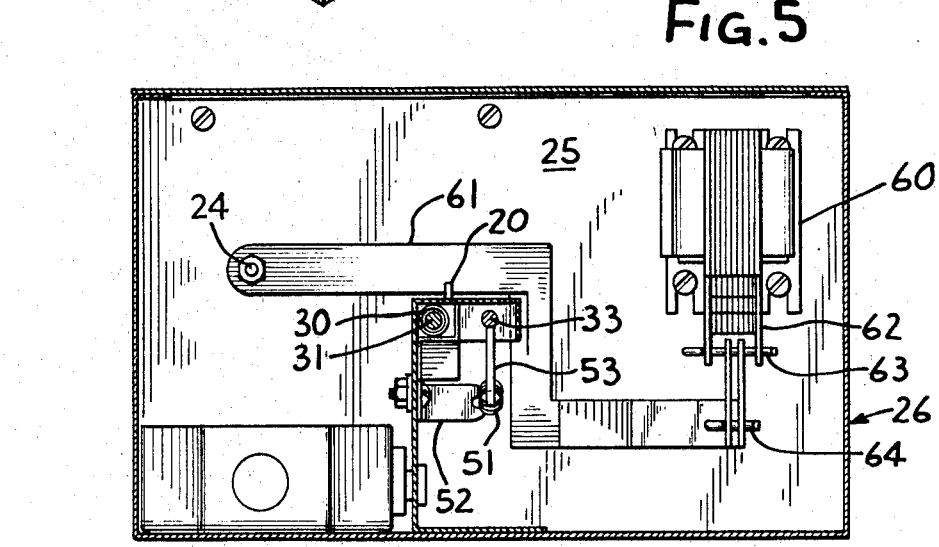
FIG. 5 is a vertical section similar to that shown in FIG. 4, but showing a modified damper mechanism embodying the invention.

In a modified embodiment of the invention illustrated in FIG. 5, structure which is identical to that in the preferred embodiment of FIGS. 1–4 has been identified by the same reference numerals. The embodiment of FIG. 5 differs from the previously described embodiment in that the solenoid 60 and the outside latching element 61 are designed so that the latching element 61 is in its latched position when the solenoid is deenergized, and is moved to its unlatched position in response to energization of the solenoid 60. More particularly, the latching element 61 is generally L-shaped with one end pivoted on the forward housing wall 26 as at 24, and the other end connected to the solenoid armature 62 via cotter pins 63 and 64. The solenoid 60 is normally deenergized with the armature 62 in its advanced position as shown in FIG. 5; when energized, the solenoid 60 retracts the armature 62 to pivot the latching element 61 upwardly about its pivot point 24, thereby releasing the damper door 13 for closing by the spring 30. This system has the advantage of avoiding the need for continuous energization of the solenoid, although it does not have the fail-safe feature of the system described previously. That is, with the system of FIG. 5, the latching element 61 is normally held in the latched position by gravity, and in order to move it to the unlatched position, the solenoid 60 must be energized either manually by an operator or by an automatic control device. For example, a temperature responsive switching means might be provided to energize the solenoid 60 in response to a predetermined temperature, so that the damper door 13 is automatically closed at such temperature.

As can be seen from the foregoing detailed description, the present invention provides an improved kitchen ventilator damper mechanism which closes the ventilator system automatically in response to a power shutdown when a fire occurs in the ventilator system or the building in which it is contained, thereby providing a positive acting and fail-safe system. This damper mechanism can be manufactured efficiently and economically from relatively few low-cost parts, and yet it has a high degree of reliability combined with a long operating life, even when subjected to repeated opening and closing of the damper door. Moreover, all the operative parts other than the damper door are located outside the ventilator system, so that they are not exposed to the condensed greases and oils and other deleterious conditions inside the ventilator system.

I claim as my invention:

1. A damper mechanism for kitchen ventilator systems, said damper mechanism comprising the combination of a damper door pivotally mounted for movement between open and closed positions within the ventilator system, a mechanical latch operatively associated with said door and including a first latching element mounted on the door and a second latching element mounted outside the ventilator system for pivotal movement between latched and unlatched position, said first and second latching elements cooperating with each other when said door is in said open position and said second element is in said latched position to latch said door in said open position, biasing means urging said second latching element toward said unlatched position, solenoid means operatively associated with said second latching element for holding said second element in the latched position when the solenoid is energized whereby said second element is automatically moved to said unlatched position by said biasing means in response to deenergization of said solenoid, second biasing means urging said damper door toward said closed position whereby said door is automatically closed in response to movement of said second latching element to said unlatched position, and reset means for returning said damper door from said closed to said open position against the urging of said second biasing means.

2. A damper mechanism as set forth in claim 1 wherein said solenoid means is connected to the electrical power supply system for the kitchen with which the ventilator system is associated so that shutdown of said electrical supply system in the event of a fire or the like automatically deenergizes said solenoid means.

3. A damper mechanism as set forth in claim 1 wherein said reset means is a manually operated cocking rod adapted to override said second biasing means for returning said damper door from said closed position to said open position.

4. A damper mechanism as set forth in claim 1 wherein said damper door is hinged on a sidewall of the ventilator system.

5. A damper mechanism as set forth in claim 1 wherein said first latching element is a notched plate adapted to project through a narrow slot in the sidewall of the ventilator system when said damper door is in its open position, and said second latching element is adapted to fit into said notch when said second latching element is in its latched position.

6. A damper mechanism as set forth in claim 1 wherein said first latching element is adapted to cam said second latching element away from said latched position during the return movement of said door from said closed position to said open position.

References Cited

UNITED STATES PATENTS 2,813,477 11/1957 Gaylord.
3,055,285 9/1962 Gaylord.
3,065,687 11/1962 Grzswich.

MEYER PERLIN, Primary Examiner